(12) United States Patent
Bahar et al.

(10) Patent No.: US 12,383,872 B2
(45) Date of Patent: *Aug. 12, 2025

(54) ANION EXCHANGE POLYMERS AND ANION EXCHANGE MEMBRANES INCORPORATING SAME

(71) Applicant: FFI IONIX IP, INC., Wilmington, DE (US)

(72) Inventors: Bamdad Bahar, Harrington, DE (US); Chulsung Bae, Harrington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,406

(22) Filed: Mar. 4, 2024

(65) Prior Publication Data

US 2024/0286090 A1 Aug. 29, 2024

Related U.S. Application Data

(63) Continuation of application No. 17/526,937, filed on Nov. 15, 2021, now Pat. No. 11,918,959, which is a continuation of application No. 15/448,734, filed on Mar. 3, 2017, now Pat. No. 11,173,456.

(60) Provisional application No. 62/303,294, filed on Mar. 3, 2016.

(51) Int. Cl.
| | |
|---|---|
| *B01D 71/80* | (2006.01) |
| *B01D 61/44* | (2006.01) |
| *B01D 67/00* | (2006.01) |
| *B01J 41/04* | (2017.01) |
| *B01J 41/05* | (2017.01) |
| *B01J 41/13* | (2017.01) |
| *B01J 47/12* | (2017.01) |
| *C08G 10/00* | (2006.01) |
| *C08G 61/02* | (2006.01) |
| *C08J 5/22* | (2006.01) |
| *C25B 1/04* | (2021.01) |
| *C25B 13/02* | (2006.01) |
| *C25B 13/08* | (2006.01) |
| *H01M 4/88* | (2006.01) |
| *H01M 4/94* | (2006.01) |
| *H01M 8/1004* | (2016.01) |
| *H01M 8/1048* | (2016.01) |
| *H01M 8/106* | (2016.01) |
| *H01M 8/1062* | (2016.01) |
| *H01M 8/1069* | (2016.01) |

(52) U.S. Cl.
CPC ............ *B01D 71/80* (2013.01); *B01D 61/44* (2013.01); *B01D 67/00111* (2022.08); *B01J 41/04* (2013.01); *B01J 41/05* (2017.01); *B01J 41/13* (2017.01); *B01J 47/12* (2013.01); *C08G 10/00* (2013.01); *C08G 61/02* (2013.01); *C08J 5/2262* (2013.01); *C25B 1/04* (2013.01); *C25B 13/02* (2013.01); *C25B 13/08* (2013.01); *H01M 4/881* (2013.01); *H01M 4/94* (2013.01); *H01M 8/1004* (2013.01); *H01M 8/1048* (2013.01); *H01M 8/106* (2013.01); *H01M 8/1062* (2013.01); *H01M 8/1069* (2013.01); *B01D 2323/36* (2013.01); *B01D 2325/42* (2013.01); *C08G 2261/143* (2013.01); *C08G 2261/146* (2013.01); *C08G 2261/312* (2013.01); *C08G 2261/3326* (2013.01); *C08G 2261/516* (2013.01); *C08G 2261/72* (2013.01); *C08J 2365/00* (2013.01); *Y02E 60/36* (2013.01); *Y02P 70/50* (2015.11)

(58) Field of Classification Search
CPC ................. B01D 2323/36; B01D 2325/42
See application file for complete search history.

(56) References Cited

U.S. PATENT DOCUMENTS

| | | | |
|---|---|---|---|
| 5,547,551 A | 8/1996 | Bahar et al. | |
| 7,259,208 B2 | 8/2007 | Guerra et al. | |
| 11,674,009 B2* | 6/2023 | Bahar | B01J 47/016 521/27 |
| 11,918,959 B2* | 3/2024 | Bahar | C25B 13/02 |
| 11,987,680 B2* | 5/2024 | Bahar | B01J 47/12 |
| 2024/0368363 A1* | 11/2024 | Bahar | C08J 5/2231 |

FOREIGN PATENT DOCUMENTS

WO 2016081432 A1 5/2016

OTHER PUBLICATIONS

Woo-Hyung Lee, et al. Robust Hydroxide Ion Conducting Poly(biphenyl alkylene)s for Alkaline Fuel Cell, Membranes, American Chemical Society (ACS), 2013, 46 pp. 9270-9278.

* cited by examiner

*Primary Examiner* — Anca Eoff
(74) *Attorney, Agent, or Firm* — Invention To Patent Services; Alex Hobson

(57) ABSTRACT

An anion exchange membrane is made by mixing 2 trifluoroMethyl Ketone [nominal] (1.12 g, 4.53 mmol), 1 BiPhenyl (0.70 g, 4.53 mmol), methylene chloride (3.0 mL), trifluoromethanesulfonic acid (TFSA) (3.0 mL) to produce a pre-polymer. The pre-polymer is then functionalized to produce an anion exchange polymer. The pre-polymer may be functionalized with trimethylamine in solution with water. The pre-polymer may be imbibed into a porous scaffold material, such as expanded polytetrafluoroethylene to produce a composite anion exchange membrane.

16 Claims, 2 Drawing Sheets

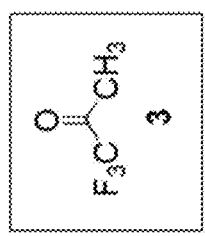
FIG. 1
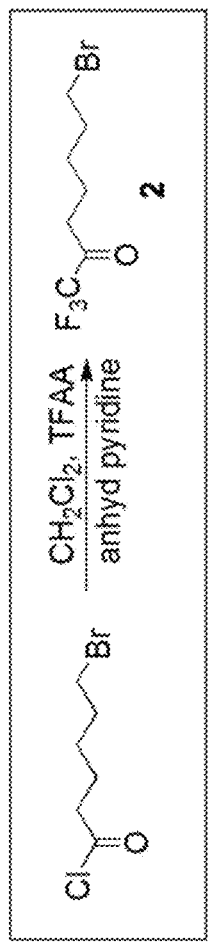
FIG. 2
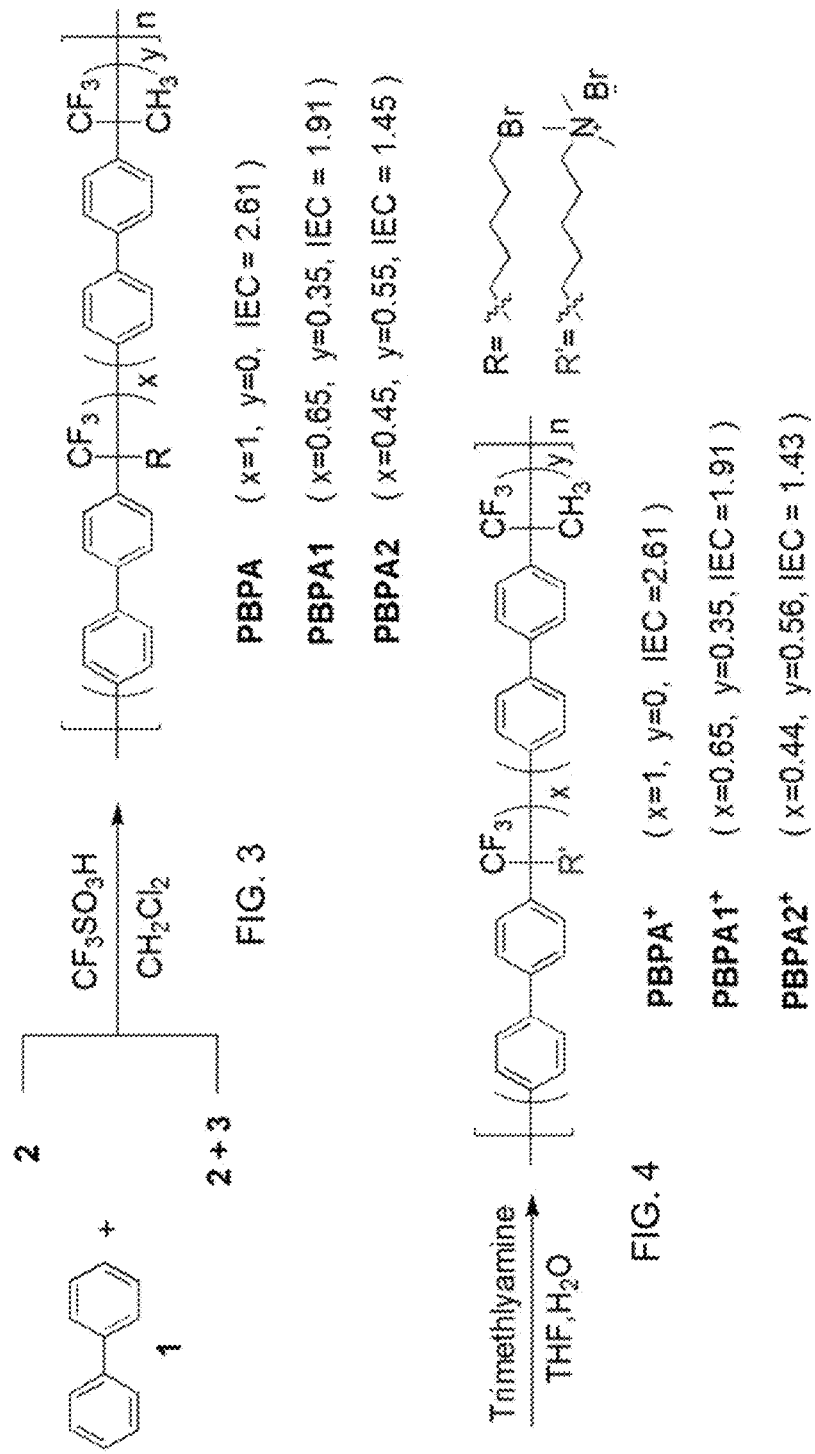
FIG. 3
FIG. 4

ANION EXCHANGE POLYMERS AND ANION EXCHANGE MEMBRANES INCORPORATING SAME

CROSS REFERENCE TO RELATED APPLICATIONS

This application is a continuation of U.S. patent application Ser. No. 17/526,937, filed on Nov. 15, 2021 and now issued as U.S. Pat. No. 11,918,959, which is a continuation of U.S. patent application Ser. No. 15/448,734 filed on Mar. 3, 2017 and now issued as U.S. Pat. No. 11,173,456 on Nov. 16, 2021, which claims the benefit of U.S. provisional patent application No. 62/303,294, filed on Mar. 3, 2016 and entitled Anion Exchange Polymers And Anion Exchange Membranes Incorporating Same, the entirety of which is hereby incorporated by reference.

BACKGROUND OF THE INVENTION

Field of the Invention

The invention is directed to unique anion exchange polymers and anion exchange membranes incorporating these polymers.

Background

Alkaline exchange membranes or anion exchange membranes (AEMs) allow for the transportation of anions (e.g., OH⁻, CL⁻, Br⁻) from the cathode to the anode in an electrochemical reaction. Anion exchange membranes are a critical component of anion exchange membrane fuel cells, where hydrogen and oxygen are used to generate electricity, with water as a byproduct. anion exchange membranes are also used in water electrolysis, where water is split into hydrogen and oxygen using electricity. In both anion exchange membrane fuel cells and water electrolysis, hydroxide ions (OH) are transported through the anion exchange membrane, along with water molecules. AEMs may also be used, for example, in batteries, sensors, electrochemical compressors, and as actuators.

Known anion exchange membranes are generally unsuitable for use in anion exchange membrane fuel cells or water electrolysis. Many commercially-available anion exchange membranes are based on polystyrene, which is generally considered a poor choice for anion exchange membranes fuel cells or water electrolysis. Other anion exchange membrane materials contain an arylene ether linkage (—O—) in the mid-chain and a benzyltrimethyl ammonium group in the side-chain. This combination, however, has been found to be chemically unstable and to degrade easily under highly alkaline conditions.

Advanced alkaline membranes are also designed to have high ion exchange capacity, which in turn means that they will have a tendency to swell with absorption of water or a polar species. This swelling results in loss of strength and renders them less suitable mechanically for service. In addition, this loss of mechanical properties implies a need for thick membranes that in turn provides for higher ionic resistance.

There is therefore a need for a chemically stable Anion exchange membrane with high ion exchange capacity, but also good mechanical properties that can be produced in thin films with low ionic resistance.

SUMMARY OF THE INVENTION

The invention is directed to anion exchange polymers and anion exchange membranes incorporating these polymers and electrochemical systems such as fuel cells or electrochemical pumps incorporating these anion exchange membranes.

In an exemplary embodiment, an anion exchange membrane comprises a mixture of: 2 trifluoroMethyl Ketone; 1 BiPhenyl; methylene chloride; and trifluoromethanesulfonic acid. These components may be mixed for a mixing time and temperature to produce a pre-polymer and then this pre-polymer may be functionalized to produce an anion exchange polymer. The pre-polymer may be dissolved in methanol to produce a polymer solution. The pre-polymer may be functionalized by mixing with trimethylamine in a solution comprising water, and/or methanol and subsequently and drying the polymer solution. Functionalizing the polymer while in the polymer solution state may increase the functionalization and thereby increase the conductivity of the subsequent anion exchange polymer produced.

An exemplary anion exchange membrane may be produced by combining the pre-polymer with a scaffold material and subsequently functionalizing the pre-polymer to produce a composite anion-exchange membrane. The pre-polymer may be dissolved to produce a polymer solution as described herein and this polymer solution may be imbibed into the porous scaffold and subsequently dried to produce a composite anion exchange membrane. A functionalizing agent, such as trimethylamine may be combined with the polymer solution before being imbibed into the porous scaffold or after being imbibed in the porous scaffold. The scaffold may be a porous membrane and may be a fluoropolymer membrane, such as expanded polytetrafluoroethylene. A fluoropolymer membrane may be a preferred porous scaffold as it is non-reactive and can withstand high continuous temperatures, such as 250° C. or more. A porous scaffold has porosity through the thickness of the material to allow the anion exchange polymer to extend and be connected from one side to a second and opposing side. A porous scaffold may be a planar material having substantially planar sides and a thickness therebetween. The thickness of a porous scaffold and a composite anion exchange membrane, may be no more than about 100 µm, no more than about 50 µm, no more than 25 µm, no more than about 15 µm and any range between and including the thickness values provided. The thinner the composite anion exchange membrane, the less resistance there may be to anion transfer. A porous scaffold may have a high percentage of open area or pores, such as at least about 50%, about 75% or more, about 85% or more, about 90% or more and even as high as 95% of more. The higher the concentration of the anion exchange polymer, the more conductive the composite anion exchange membrane will be.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows an exemplary polymer reaction of the present invention.

FIG. 2 shows an exemplary polymer of the present invention.

FIG. 3 shows an exemplary polymer reaction of the present invention.

FIG. 4 shows an exemplary polymer reaction to functionalize a polymer of the present invention.

DETAILED DESCRIPTION OF THE ILLUSTRATED EMBODIMENTS

Figure 5:
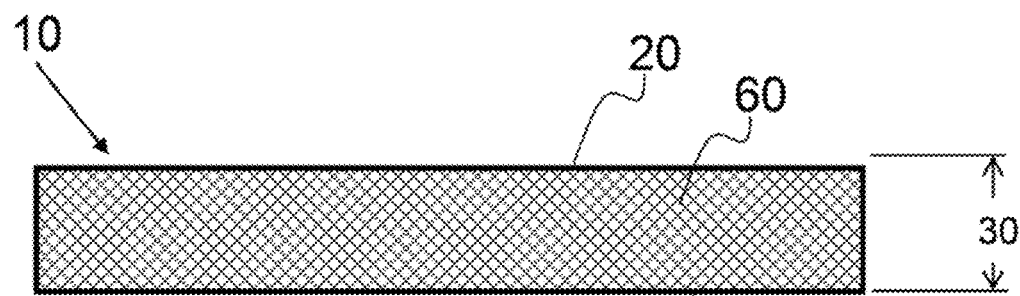
FIG. 5 shows an exemplary porous scaffold having a first side an opposing second side and pores.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIG. 1 In one embodiment, the invention provides an ionomer (7-Bromo-1,1,1-trifluoroheptan-2one (2)) was prepared according to literature or purchased commercially (ref: 647831-24-1 Molbase)

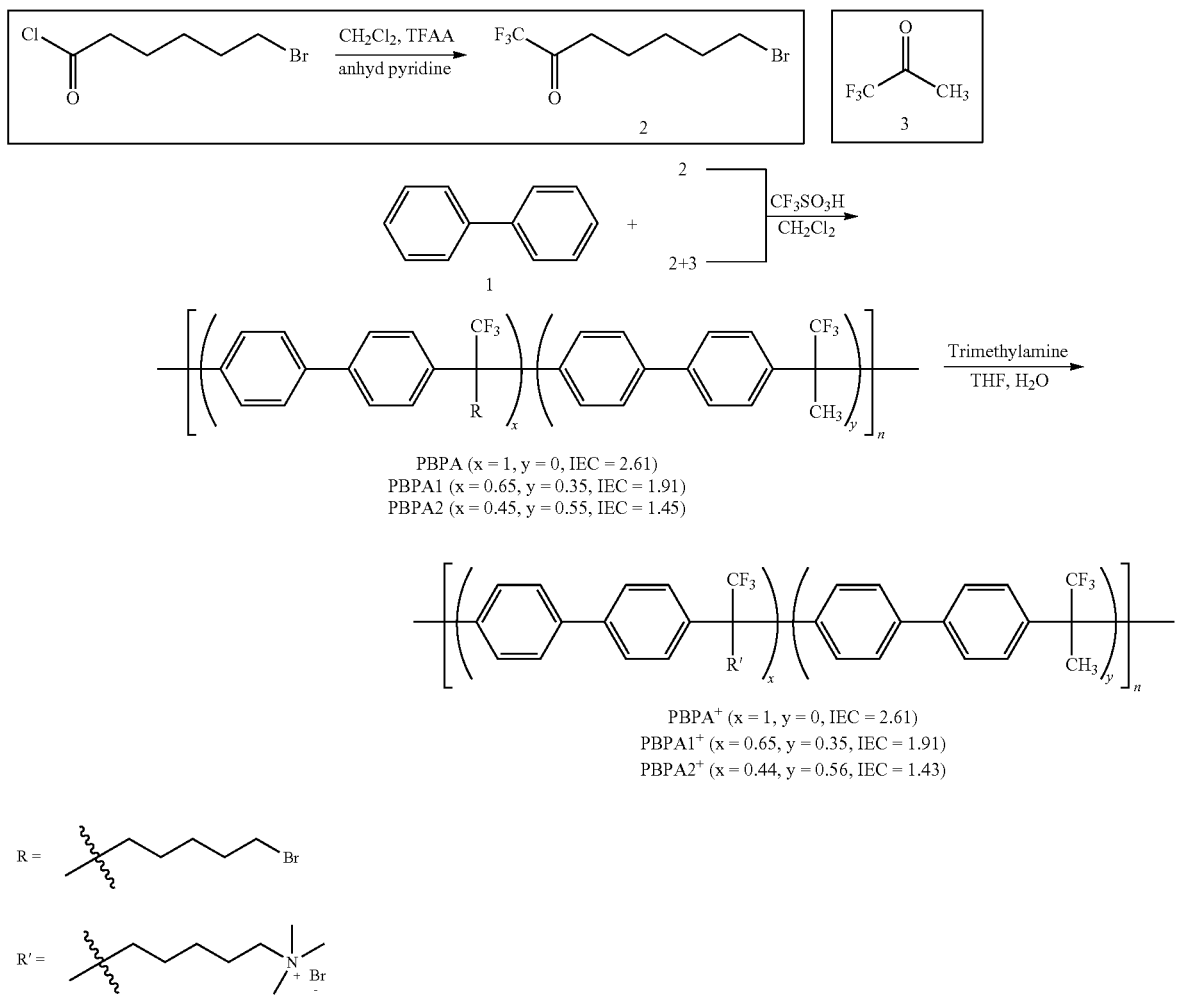

Accordingly, a mixture of 2 trifluoroMethyl Ketone [nominal] (1.12 g, 4.53 mmol), 1 BiPhenyl (0.70 g, 4.53 mmol), methylene chloride (3.0 mL), trifluoromethanesulfonic acid (TFSA) (3.0 mL), and a magnetic stirring bar was stirred at room temperature under nitrogen. After ten hours, the reaction mixture solution became highly viscous and kept being stirred for additional two hours. The resulting dark-brown, gel-like mass was then shredded with sonication and poured slowly into methanol. White fiber formed was filtered and washed with hot methanol. After drying under vacuum, 1.70 g of white fiber-like solid was obtained (97% yield). Or alternatively, a polymer according to the same general formula where in each of R1 and R2 is, independently, a linear alkyl chain or a cyclic alkyl chain, and Z is selected from a group consisting of: a linear alkyl chain, a cyclic alkyl chain, and an alkylene ether chain.

The polymer is then dissolved in methanol (or one of generally well known organic solvents such as DMSO) at a 5% weight ratio i.e. 1 gram of polymer, 19 grams of methanol.

The mixture was then poured onto a 12 micron thick (Ref MBU200.012) expanded PTFE membrane supplied by TTG Inc. The mixture was then spread using a draw bar, and dried using a hot air dryer.

This process was repeated. The resulting membrane was 15 microns thick. The membrane was tear resistant, and folded comfortably without breakage. It was therefore mechanically suitable for use, and thin. Those skilled in the art, can appreciate that this process can be performed on a roll to roll, composite production system, with rollers, and draw bars in place; with hot air or other types of ovens in a generally continuous process.

The membrane was then functionalized by dipping the membrane in trimethylamine in solution with water to provide ion exchange capacity with quaternized ammonium hydroxide.

Embodiments of the invention involve composites include a new class of quaternized ammonium hydroxide-containing polymers prepared from a styrene-butadiene block copolymer (SEBS). This new class of polymers may be used in alkaline exchange membranes (AEMs), lack an arylene ether linkage in the polymer main-chain, and can prepared with any of a number of quaternized ammonium groups in the polymer side-chains.

A SEBS, compound I, is employed where x and y are mol % of each repeating unit and 2x+y=100. For example, in some embodiments of the invention, x is 15 and y is 70. Other values are possible, of course, as will be recognized by one skilled in the art. An iridium-catalyzed borylation is then performed using bis(pinacolato)diboron (B2Pin2) to introduce a boronic ester group into the aromatic rings of the SEBS, yielding compound II.

Polymers according to embodiments of the invention may be employed in any number of contexts, including, for example, as fuel cell alkaline exchange membranes, fuel cell ionomers, electrolysis alkaline exchange membranes, as actuators, and in any number of battery applications, as will be apparent to one skilled in the art.

One skilled in the art will also recognize, of course, that various changes, additions, or modifications of or to the methods described above may be made without substantively altering the compounds obtained or their characteristics. Such changes, additions, and modifications are therefore intended to be within the scope of the invention.

As shown in FIG. 5, an exemplary porous scaffold 10 has a thickness 30 from a first side 20 an opposing 40 second side. The porous scaffold has pores 60 and an open structure that extends from the first to the second side to allow a flow of fluid from a first to the second side. The porous scaffold is permeable and will have a bulk flow of air from the first to the second side.

Figure 6:
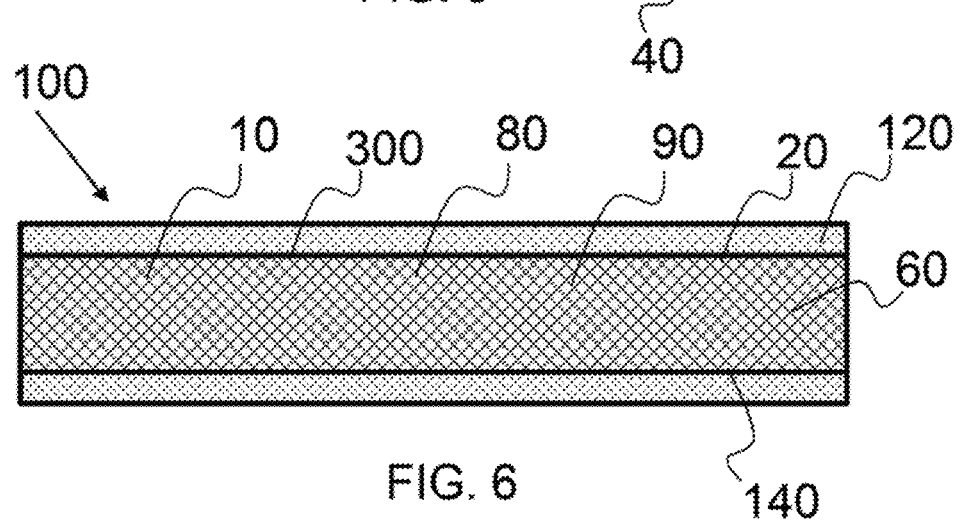
FIGS. 6 and 7 show a cross-sectional diagram of a composite anion exchange membrane comprising a porous scaffold, a pre-polymer that has functional groups thereon.
Figure 7:
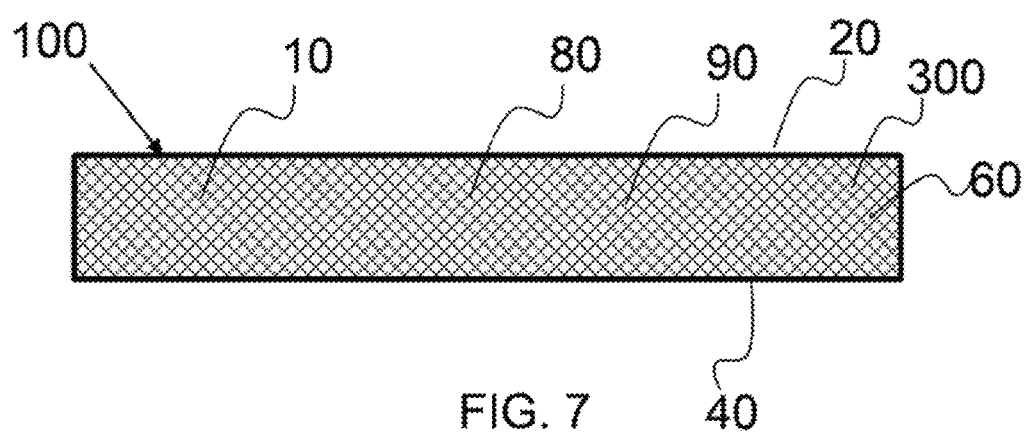

FIGS. 6 and 7 show a cross-sectional diagram of a composite anion exchange membrane 100 comprising a porous scaffold 10, a pre-polymer 80 that has functional 90 groups thereon. As shown in FIG. 6, the pre-polymer forms a surface coating layer 120 on the first side 20 and a surface coating layer 140 on the second side of the porous scaffold. As shown in FIG. 7, there is substantially no surface coating layer. The functionalized pre-polymer is an anion exchange polymer 300.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A composite anion exchange-membrane comprising:
   a) a porous scaffold material comprising pores;
   b) pre-polymer which is a reaction product of:
      i) 2 trifluoroMethyl Ketone;
      ii) 1 BiPhenyl;
      iii) methylene chloride; and
      iv) trifluoromethanesulfonic acid; and
   wherein the pre-polymer is within the pores of the porous scaffold material.

2. The composite membrane of claim 1,
   wherein the porous scaffold has a thickness of no more than about 50 μm.

3. The composite membrane of claim 1,
   wherein the porous scaffold has a thickness of no more than about 25 μm.

4. The composite membrane of claim 1,
   wherein the porous scaffold has a thickness of no more than about 15 μm.

5. The composite membrane of claim 1,
   wherein the pre-polymer forms a surface layer on the porous scaffold.

6. The composite membrane of claim 1,
   wherein the pre-polymer forms a surface layer on a first side and a second side, opposing said first side, of the porous scaffold.

7. The composite membrane of claim 1,
   wherein the porous scaffold has an open area of at least 75%.

8. The composite membrane of claim 1,
   wherein the porous scaffold has an open area of at least 85%.

9. The composite membrane of claim 1,
wherein the porous scaffold is an expanded polytetrafluoroethylene membrane.

10. The composite membrane of claim 9,
wherein the porous scaffold has a thickness of no more than about 50 μm.

11. The composite membrane of claim 9,
wherein the porous scaffold has a thickness of no more than about 25 μm.

12. The composite membrane of claim 9,
wherein the porous scaffold has a thickness of no more than about 15 μm.

13. The composite membrane of claim 9,
wherein the pre-polymer forms a surface layer on the porous scaffold.

14. The composite membrane of claim 9,
wherein the pre-polymer forms a surface layer on opposing sides of the porous scaffold.

15. The composite membrane of claim 9,
wherein the porous scaffold has an open area of at least 75%.

16. The composite membrane of claim 9,
wherein the porous scaffold has an open area of at least 85%.

* * * * *